United States Patent [19]

Mitchell et al.

[11] 4,037,391
[45] July 26, 1977

[54] LEAF GUIDE MEANS FOR TOBACCO HARVESTER

[75] Inventors: John D. Mitchell; Bertram L. Jordan, both of Lewiston, N.C.

[73] Assignee: Harrington Manufacturing Company, Lewiston, N.C.

[21] Appl. No.: 507,901

[22] Filed: Sept. 20, 1974

[51] Int. Cl.² ............................................. A01D 45/16
[52] U.S. Cl. ..................................... 56/27.5; 56/190; 198/640; 198/494
[58] Field of Search ................. 56/27.5, 190; 198/229, 198/230, 228

[56] References Cited

U.S. PATENT DOCUMENTS

| 459,369 | 9/1891 | Reeves | 198/228 |
|---|---|---|---|
| 1,022,325 | 4/1912 | Moore | 198/228 |
| 1,239,066 | 9/1917 | Winters | 198/230 X |
| 2,811,241 | 10/1957 | Bogaty | 198/229 |
| 3,841,071 | 10/1974 | Pinkham et al. | 56/27.5 |

FOREIGN PATENT DOCUMENTS

| 482,329 | 11/1928 | Germany | 198/230 |

OTHER PUBLICATIONS

Roanoke Automatic Tobacco Primer Manual No. 1745, p. 28, Feb. 1974.

Primary Examiner—Jay N. Eskovitz
Attorney, Agent, or Firm—Fred Philpitt

[57] ABSTRACT

An improved tobacco harvester including roller members positioned adjacent to the upper rear end of the conveyor which functions to disengage leaves from the return side of the conveyor, and a cover arrangement over the discharge end of the conveyor to protect the discharged leaves from the force of winds.

1 Claim, 3 Drawing Figures

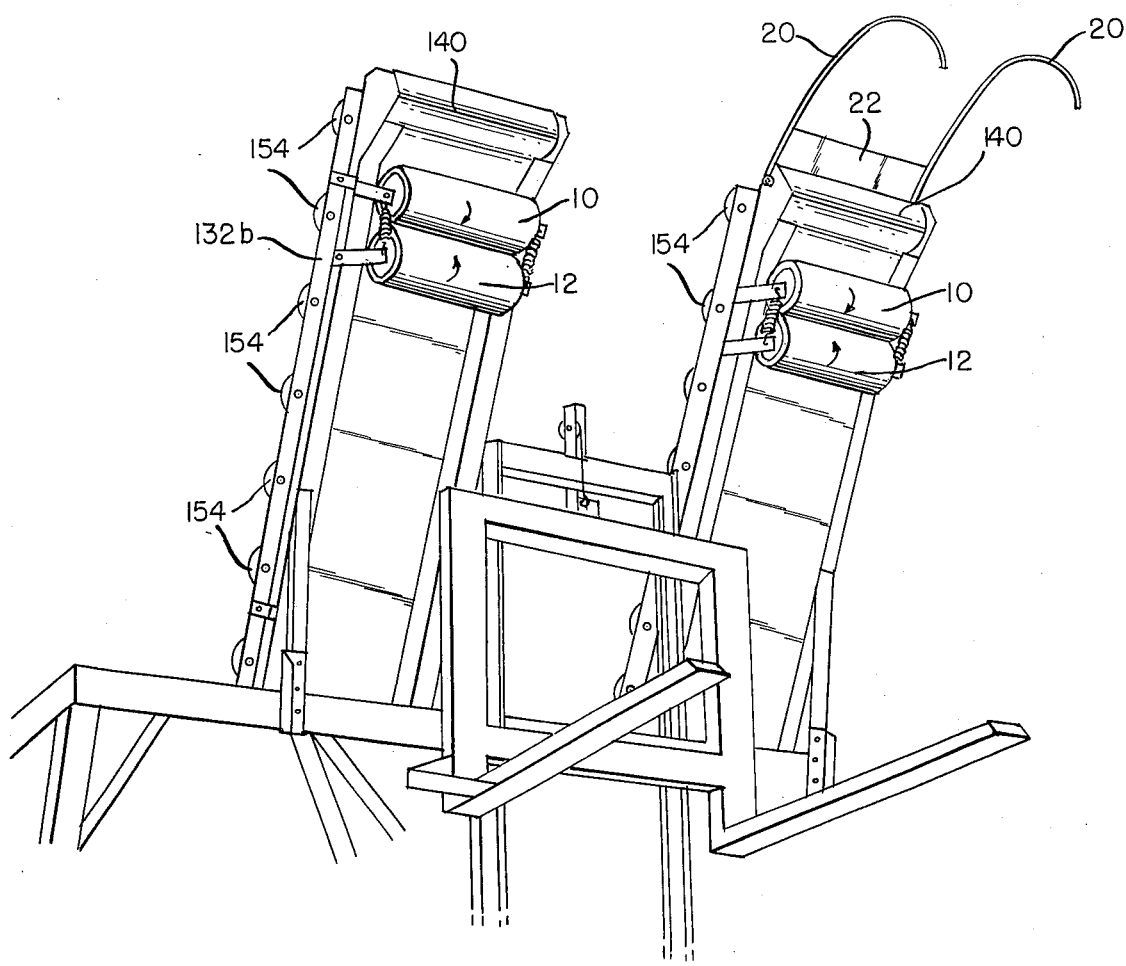

LEAF GUIDE MEANS FOR TOBACCO HARVESTER

BACKGROUND

Automatic tobacco harvesters are now a commercial reality and are being used by an increasing number of tobacco farmers because of both the scarcity and high cost of competent labor. All of the harvesters now on the market involve a framework which provides an elongated front-to-rear passageway for tobacco plants and leaf defoliating means on each side of this passageway which are designed to strip leaves from the tobacco stalks as they pass through said passageway.

THE PRESENT INVENTION

Our invention pertains to an improvement upon the tobacco harvester described and shown in U.S. patent application Ser. No. 259,899, filed June 5, 1972, and now U.S. Pat. No. 3,841,071.

Our invention also pertains to an improvement upon the Roanoke Automatic Tobacco Primer which is the commercial embodiment of the tobacco harvester disclosed in the aforementioned Ser. No. 259,899. Copies of the Operator's Service Manuals (Numbers 1725 and 1745) for the Roanoke Automatic Tobacco Primer are attached hereto and are incorporated herein by reference.

Figure 1:
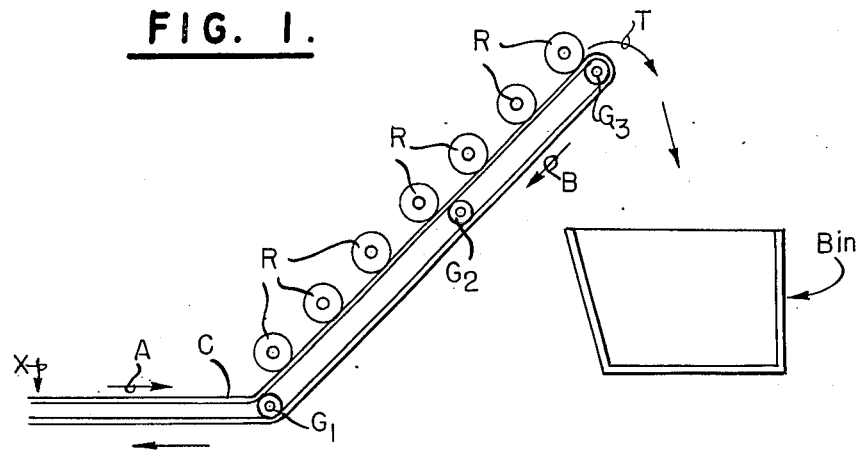

FIG. 1 schematically illustrates the arrangement used in Ser. No. 259,899 for transporting defoliated tobacco leaves rearwardly and upwardly. A conveyor C is supported and or driven by a plurality of gear wheels $G_1$, $G_2$, and $G_3$. Tobacco leaves deposited at point X will move in the direction of arrow A because the conveyor C is moving in that direction. The leaves will be transported rearwardly and upwardly on the conveyor C and will be retained along that inclined run by a plurality of large sponge rubber covered idler rollers R. At the point where the conveyor changes direction and starts in the direction of arrow B, the leaves should follow the trajectory T and drop in the bin. However, it has been found that leaves sometimes continue to follow the conveyor around the top of its inclined path (i.e., around gear $G_3$) with the result that the leaves will travel for at least a limited distance in the direction of arrow B, and with the result that they will drop to the ground rather than in the collecting bin.

We found that this problem could be solved by positioning at least one roller on the underside of the conveyor adjacent the point where the leaves are to be discharged into a collecting bin. Referring to FIG. 2, two longitudinal conveyors (preferably comprising a series of parallel spaced bars 140 that are linked together at their ends) are driven by sprockets (not shown) located adjacent the top of the inclined run of the conveyors. In the operation of each conveyor the tobacco leaves are moved upwardly and are retained along the inclined run 132b by a series of large (approximately 8 inches in diameter) sponge rubber covered idler rollers 153 which are disposed above the conveyor bars 140.

Two freely rotatable leaf deflecting rollers 10 and 12 are mounted adjacent the conveyor at a point shortly after the conveyor has reversed its upward direction and has started downwardly. Deflecting roller 10 is spaced slightly away from the conveyor but deflecting roller 12 is mounted so that it will press against the conveyor. Since deflecting roller 12 is pressed against the conveyor and is freely rotatable it will rotate in direction indicated by the arrow. Deflecting roller 12 is also spring biased against deflecting roller 10, which will mean that when the movement of the conveyor causes deflecting roller 12 to rotate in the indicated direction, it will in turn cause deflecting roller 10 to rotate in the direction indicated. With this arrangement when a leaf "goes around" the top of the conveyor, deflecting roller 10 will contact it and cause it to move outwardly from the conveyor in a trajectory T which will deposit it in the collecting bin. With our invention nearly all of the leaves will "float" downwardly into the collecting bin.

Instead of using two deflecting rollers, one could be used provided some means was provided for causing it to rotate in the direction indicated for roller 10.

Figure 3:
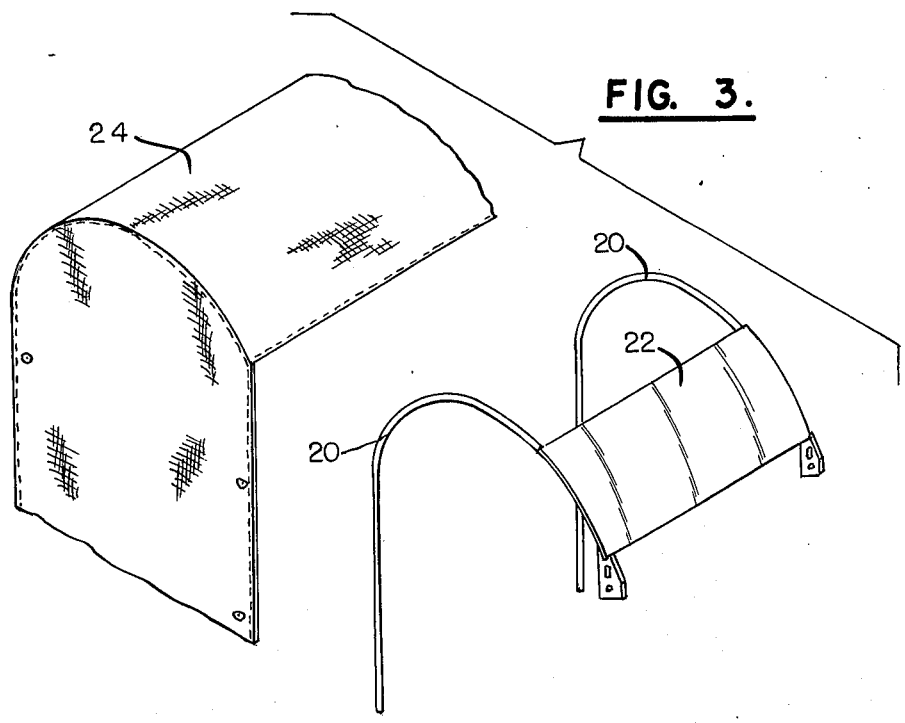

Another arrangement which we have discovered that is very useful in this area of the harvester is a windscreen arrangement that will permit the leaves that are discharged from the upper back end of the conveyor to float gently down into the collecting bin. This arrangement is illustrated in FIGS. 2 and 3 and is seen to consist of two generally arc-shaped rods 20 that are joined to the upper part of the conveyor frame and which extend upwardly and rearwardly thereof. A plate 22 bridges these two rods in order to offer enough rigidity that a canvas cover 24 can be placed thereover. This arrangement insures that the leaves discharged from the upper rear end of the conveyor will not be blown sideways or agitated by winds. The leaves will fall freely into the bin and be deposited therein in a much more orderly way.

We claim:

1. An improved tobacco leaf conveyor arrangement for a mobile tobacco harvester which comprises in combination:
   a. an endless conveyor surface that is disposed on a tobacco harvester, the ascending portion of said endless conveyor extending rearwardly and upwardly to a leaf discharge point, the descending portion of the endless conveyor extending from said discharge point downwardly and forwardly to a point where it can receive leaves for lifting;
   b. a first roller means mounted so that its periphery will press against the descending portion of the conveyor at a point near the leaf discharge point of the conveyor,
   c. a second roller means mounted adjacent to and above said first roller means and with its periphery pressed against the periphery of said first roller means in a driving relationship, said second roller means being located closer to said leaf discharge point of said conveyor surface than said first roller means, whereby said second roller means will rotate in a direction opposite to the direction of movement of the descending portion of the conveyor surface to thus assist in disengaging leaves from said conveyor surface adjacent said discharge point.

* * * * *